US008830175B2

(12) United States Patent
Lin

(10) Patent No.: US 8,830,175 B2
(45) Date of Patent: Sep. 9, 2014

(54) AUXILLIARY INPUT DEVICE FOR VIRTUAL KEYBOARD

(76) Inventor: Chia-Ching Lin, Taipei (TW)

(*) Notice: Subject to any disclaimer, the term of this patent is extended or adjusted under 35 U.S.C. 154(b) by 388 days.

(21) Appl. No.: 13/295,079

(22) Filed: Nov. 13, 2011

(65) Prior Publication Data

US 2013/0069879 A1      Mar. 21, 2013

(30) Foreign Application Priority Data

Sep. 19, 2011   (TW) .............................. 100217505 U

(51) Int. Cl.
*G06F 3/045* (2006.01)
*G06F 3/02* (2006.01)
*G06F 1/16* (2006.01)

(52) U.S. Cl.
CPC ... *G06F 3/02* (2013.01); *G06F 1/16* (2013.01)
USPC ......................................................... 345/168

(58) Field of Classification Search
CPC ..................................... G06F 1/16; G06F 3/02
USPC .................................................. 345/168–169
See application file for complete search history.

(56) References Cited

U.S. PATENT DOCUMENTS

2008/0316180 A1*  12/2008  Carmody et al. ............. 345/172
2011/0241999 A1*  10/2011  Thier ............................ 345/168

* cited by examiner

*Primary Examiner* — Quan-Zhen Wang
*Assistant Examiner* — Tony Davis
(74) *Attorney, Agent, or Firm* — Li & Cai Intellectual Property (USA) Office

(57) ABSTRACT

An auxiliary input device for virtual keyboard sized on a displayed virtual keyboard of a capacitive touch panel, comprising: a membrane and a plurality of conducting keys. The membrane has a plurality of bulged supporting members arranged in correspondence to the plurality of virtual keys of the virtual keyboard, wherein a trough is arranged facing the virtual keyboard between every two adjacent supporting members. The conducting keys are arranged atop each of the supporting member, and kept at a predetermined distance from the capacitive touch panel, the conducting keys selectively operable to establish contact with the capacitive touch panel. The auxiliary input device for virtual keyboard is a thin structure which provides tactile feedback and pressure-sensitivity just like a physical keyboard, and is advantageous in its low cost construction, easy portability and the lack of additional power consumption.

4 Claims, 6 Drawing Sheets

AUXILLIARY INPUT DEVICE FOR VIRTUAL KEYBOARD

BACKGROUND OF THE INVENTION

1. Field of the Invention

The present invention relates to an auxiliary input device; in particular, to an auxiliary input device adaptable on a virtual keyboard for providing tactile feedback.

2. Description of Related Art

As Tablet Computers (TC) become widely popular in modern daily life, the adaption of tactile operable touch panel displays has become ubiquitously common. In order to reduce the weight and volume of portable device such as a Tablet Computer (TC), physical keyboards are frequently abandoned and replaced with virtual keyboards displayed on the touch panel/screens.

However, the operational convenience of physical keyboards can hardly be replaced by virtual keyboards, partly due to the fact that a virtual keyboard cannot offer physical tactile feedback to a user; the only feedback a user receives when typing on a touch screen is visual, hence the lack of physical tactile feedback deeply hinders typing accuracy and restricts the typing speed. In comparison, physical keyboards can provide tactile boundaries for users, thus enabling typing without relying solely on the visual sense. Therefore, when a vast amount of text-inputting is required, users of TC often resort to the use of externally connected auxiliary keyboards. However, external keyboards are connected with the TC either via wire or wireless means, which may in turn increase the energy consume rate of the TC as well as adding weight and volume carried by users. Because of the abovementioned shortcomings of external keyboards, the popularity thereof has so far only been limited among a minor group of people.

Therefore, acquiring capabilities of operational and portability convenience as well as energy-saving advantages shall be the objects which related field researchers should pursue.

SUMMARY OF THE INVENTION

The object of the present invention is to provide an auxiliary input device sized on a displayed virtual keyboard of a capacitive touch panel.

An embodiment of the present invention provides an auxiliary input device for virtual keyboard, comprising: a membrane and a plurality of conducting keys wherein the membrane has a plurality of bulged supporting members arranged in correspondence to the plurality of virtual keys of the virtual keyboard, wherein a trough is arranged facing the virtual keyboard between every two adjacent supporting members. The plurality of conducting keys are arranged atop each of the supporting member and kept at a predetermined distance from the capacitive touch panel, the conducting keys selectively operable to establish contact with the capacitive touch panel.

An embodiment of the present invention provides another auxiliary input device sized on a displayed virtual keyboard of a resistive touch panel.

An embodiment of the present invention provides another auxiliary input device for virtual keyboard, comprising: a membrane, a plurality of key portions and a plurality of elastic bumps. The membrane has a plurality of bulged supporting members arranged in correspondence to the plurality of virtual keys of the virtual keyboard, wherein a trough is arranged facing the virtual keyboard between every two adjacent supporting members. The plurality of key portions are arranged atop each of the supporting members and kept at a predetermined distance from the resistive touch panel. The plurality of elastic bumps are arranged beneath the key portions selectively operable to establish contact with the resistive touch panel.

The present invention has the following advantages: the auxiliary input device for virtual keyboard in accordance with the present invention provides the users tactile feedback and pressure-sensitivity just like typing on a physical keyboard without the need to solely rely on vision to pin-point the exact location of a particular key being pressed, thereby enabling the performance of the traditional "blind inputting" technique. Specifically, the auxiliary input device for virtual keyboard of the present invention is a thin structure that can be kept and installed easily, and is advantageous in its low cost construction, easy portability, and the lack of additional power consumption.

In order to further the understanding regarding the present invention, the following embodiments are provided along with illustrations to facilitate the disclosure of the present invention.

DETAILED DESCRIPTION OF THE PREFERRED EMBODIMENTS

The aforementioned illustrations and following detailed descriptions are exemplary for the purpose of further explaining the scope of the present invention. Other objectives and advantages related to the present invention will be illustrated in the subsequent descriptions and appended drawings.

The auxiliary input device for virtual keyboard of the present invention is a side device of an electrical device accommodating a touch panel. Based on the type of touch panels utilized, the auxiliary input devices for virtual keyboard shall have varying structural designs. Three embodiments in accordance with the present invention will be provided for further illustration.

The First Embodiment

Figure 1:
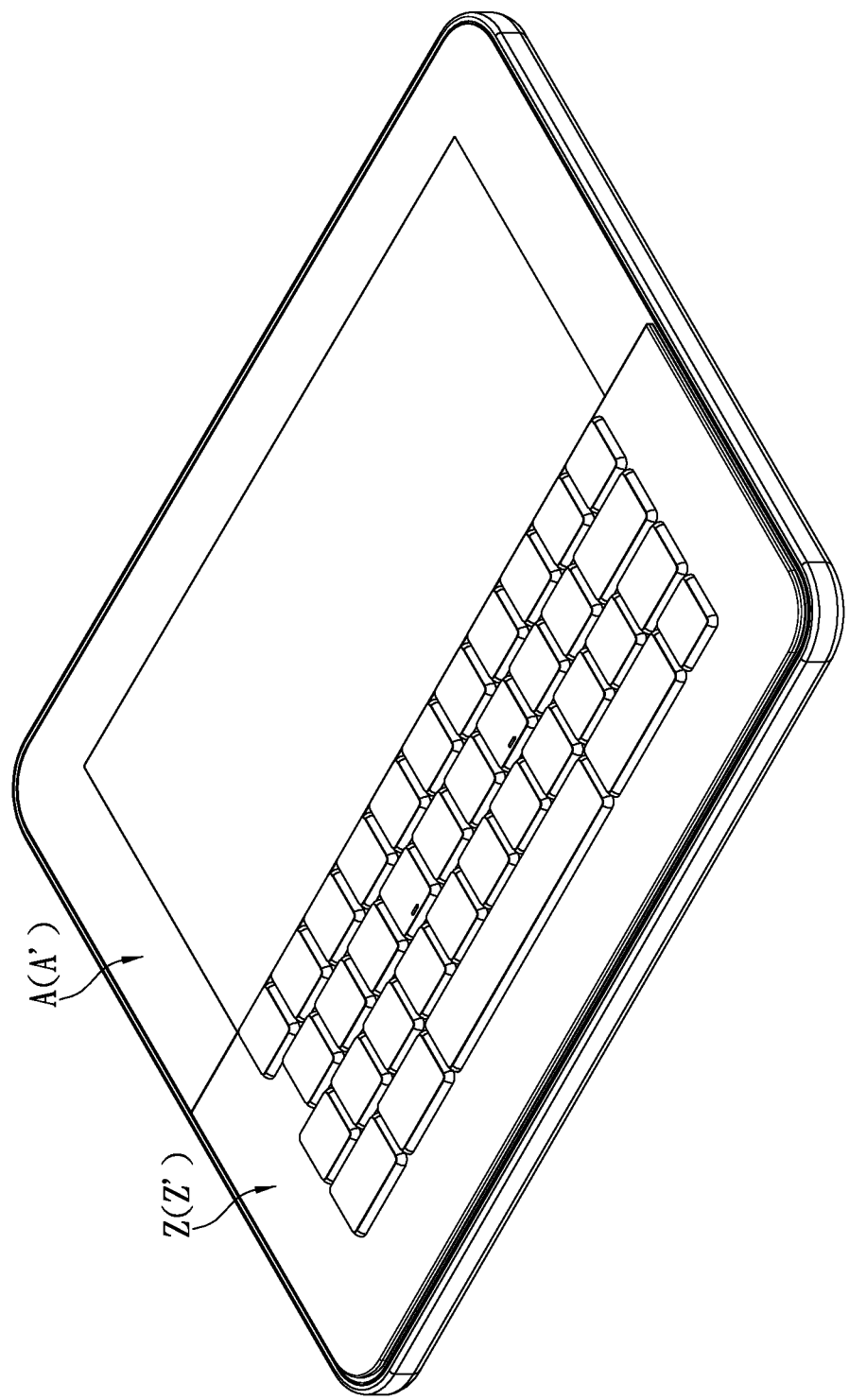
FIG. 1 shows a perspective view of the assembly of the auxiliary input device for virtual keyboard of the present invention with a touch panel.
Figure 2:
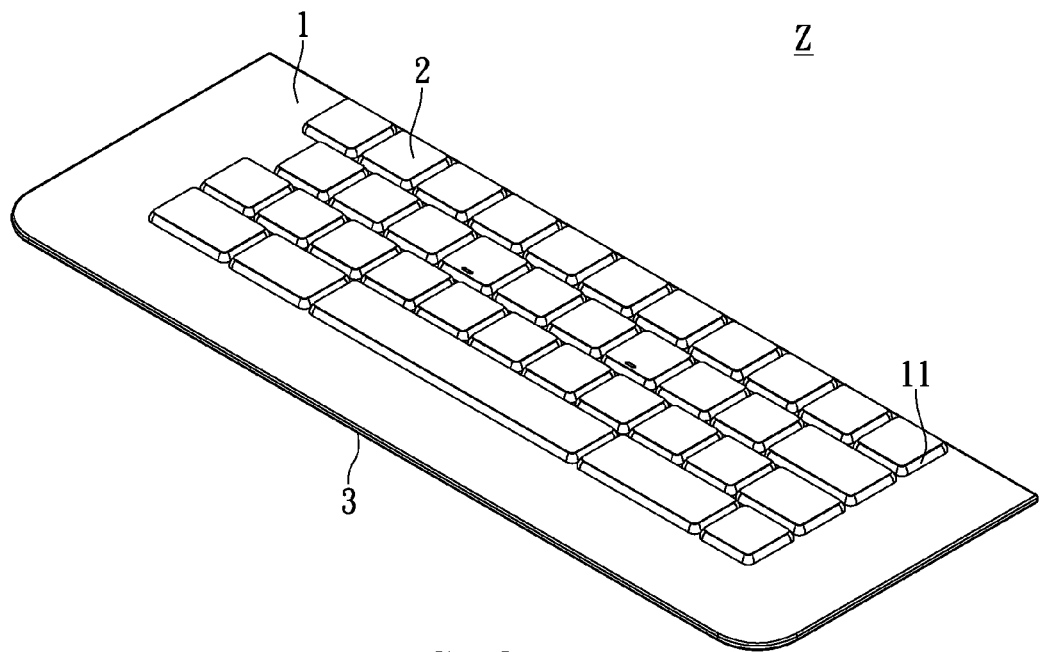
FIG. 2 shows a three-dimensional perspective view of the first embodiment from an angle in accordance with the present invention.
Figure 3:
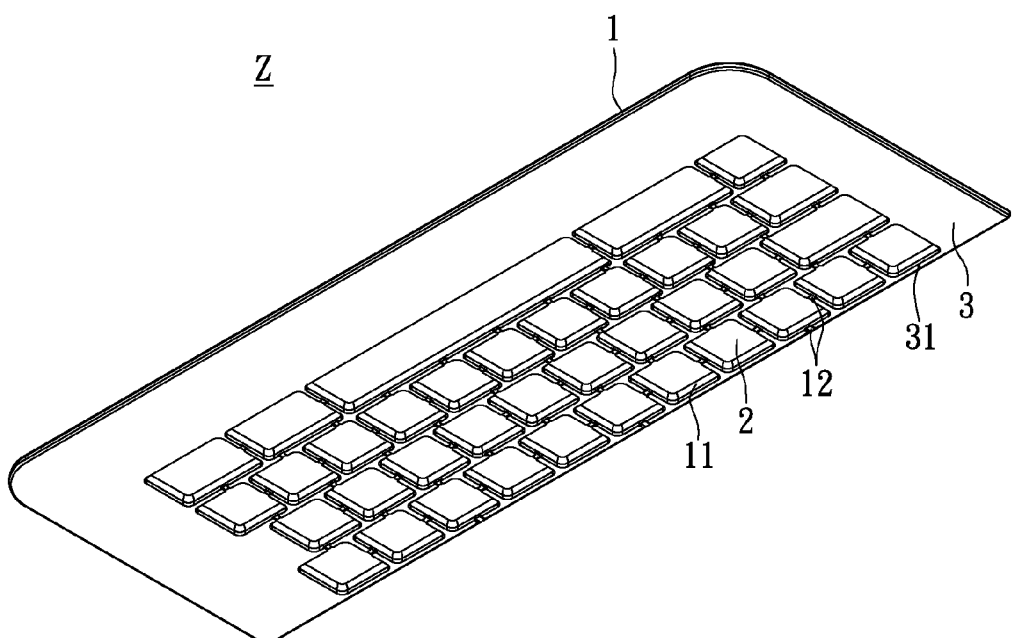
FIG. 3 shows a perspective view of the first embodiment from another angle in accordance with the present invention.

With reference to FIGS. 1-3 which show the first embodiment of the present invention. The auxiliary input device for virtual keyboard Z is adapted to accommodate an electronic device that utilizes a capacitive touch panel A. The auxiliary input device for virtual keyboard Z of the electronic device is adapted to be arranged on the capacitive touch panels, and comprises: a membrane 1 and a plurality of conducting keys 2 wherein the size of the membrane 1 is substantially larger or equivalent to the virtual keyboard, the membrane 1 has a plurality of bulged supporting members 11 arranged in correspondence to the plurality of virtual keys of the virtual keyboard, wherein a trough 12 is arranged facing the virtual keyboard between every two adjacent supporting members. A plurality of conducting keys 2 are arranged atop each of the supporting member 11 on the membrane 1 and an insulating layer 3 is arranged underneath the membrane 1, wherein a plurality of through holes 31 are aligningly arranged in correspondence to the virtual keys formed therein.

Figure 4:
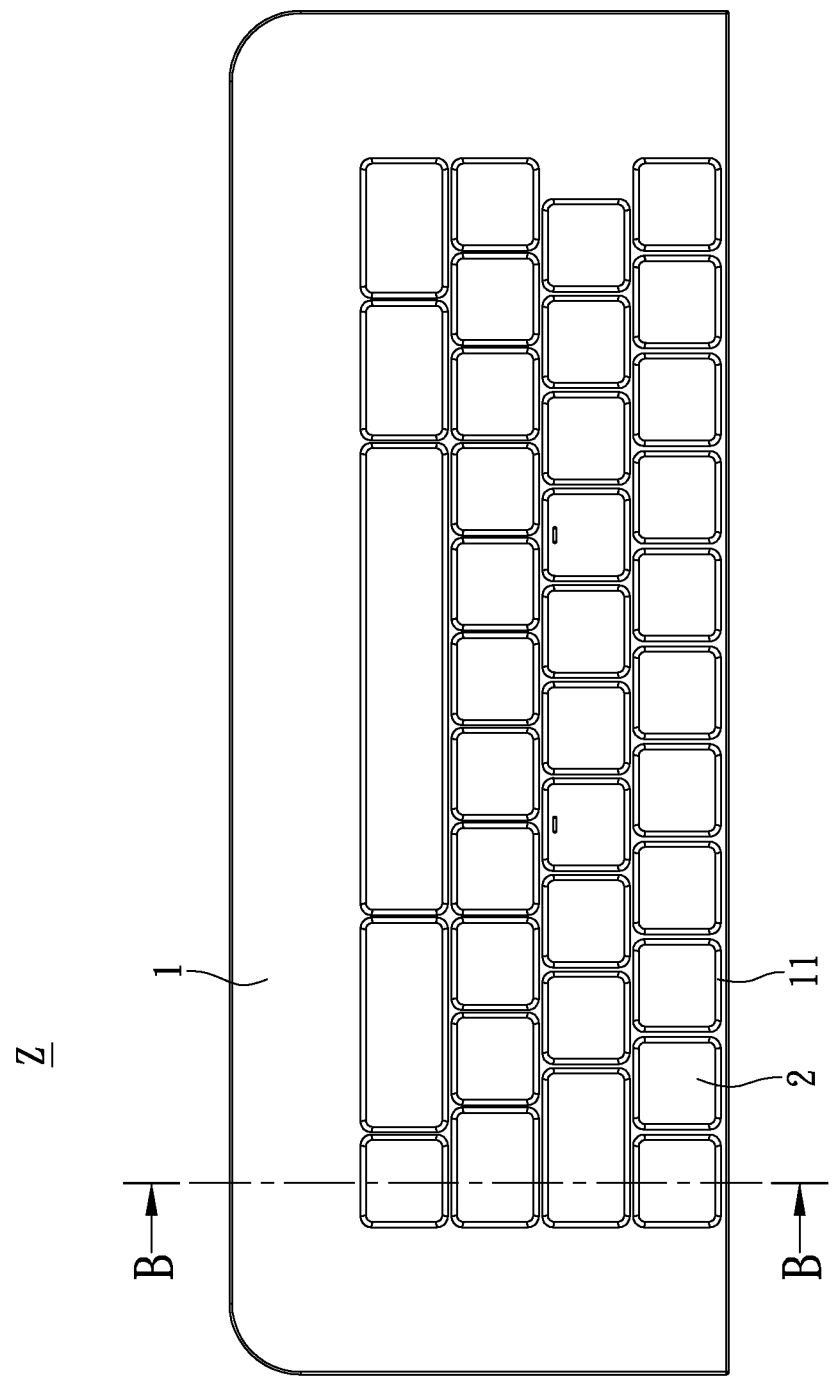
FIG. 4 shows a top view of the first embodiment in accordance with the present invention.
Figure 5:
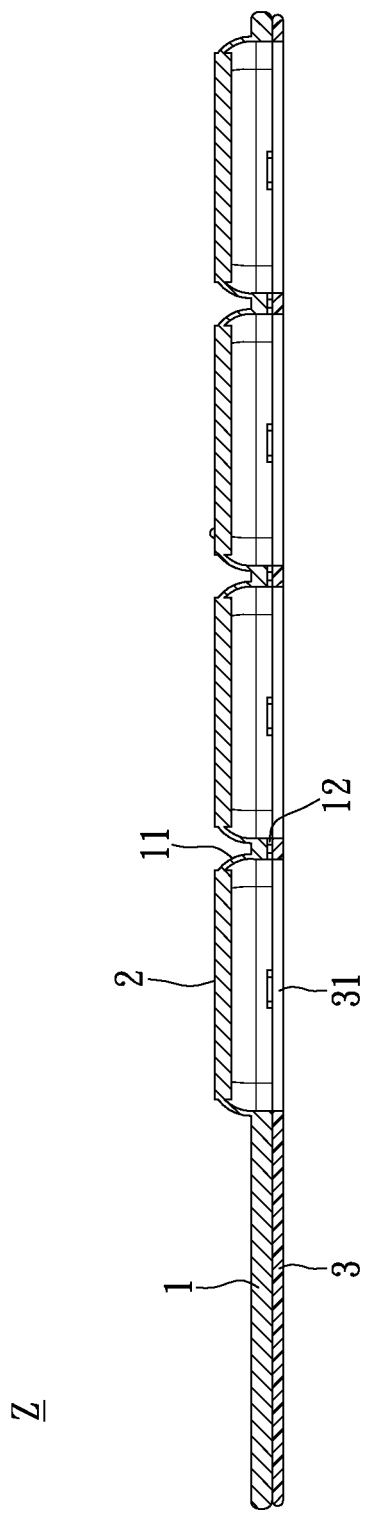
FIG. 5 shows a cross-sectional view of the first embodiment in accordance with the present invention.

Referring now to FIGS. 4-5, the FIG. 5 is a cross-sectional perspective view in the section line B of the FIG. 4. The conducting keys 2 are arranged atop each of the bulged supporting member 11 of the membrane 1, thereby enabling the conducting key 2 to be supported by the supporting members 11 and kept a predetermined distance from the capacitive touch panel A. Underneath the conducting keys 2 are through holes 31 formed in the insulating layer 3 (refer to FIG. 3 and FIG. 5). With reference to FIGS. 1-2, when a selected conducting key 2 is being depressed, the conducting key 2 passes through the through hole 31 to establish direct contact with the capacitive touch panel A. When the user depress the conducting key 2 to establish contact with the capacitive touch panel A, the corresponding virtual key resonates through the circuit of the capacitive touch panel A which is connected electrically with the conducting key 2.

The suggested thickness of the membrane 1 and the supporting members 11 is between 1.3 mm~2.5 mm and 0.2 mm~0.4 mm respectively. When the conducting key 2 is being depressed, the arched-structure formed of the supporting member 11 enables the auxiliary input device for virtual keyboard Z to provide pressure-sensitivity and tactile feedback; however, the thickness of the supporting member 11 is not limited to by this.

Referring to FIGS. 1, 3 and 5, the auxiliary input device for virtual keyboard Z is sized on the displayed virtual keyboard of the capacitive touch panel A. Each of the supporting member 11 of the membrane 1 and the conducting key 2, the insulating layer 3 and the capacitive touch panel A encirclingly defining an air room. As a trough 12 structure is arranged facing the virtual keyboard between every two adjacent supporting members 11, therefore every two adjacent air rooms are mutually connected through the trough 12, further comprising at least one air room arranged to provide gas communication with the outside surrounding (not shown) of the input device, thereby enabling gas communication of all the air rooms between the input device and the touch screen to the outside either directly or indirectly through the trough 12. When the user depresses the conducting key 2, the air within the air room is being compressed and flows into the other air rooms via the trough 12. When the conducting key 2 is released, the internal air reflows due to the air pressure difference, thus, returning the conducting key 2 to the original position. Thus, by utilizing the trough 12 which is connected to all the air rooms enables air to reflow effectively into the released conducting key 2 to return into the original position.

Shown in FIG. 1, as the membrane 1 is made from an electrically conductive material wherein the type of material is not restricted, if the membrane 1 is arranged directly on the capacitive touch panel A, due to the fact that the connection interface of the membrane 1 and the capacitive touch panel A is electrically connected, the capacitive touch panel A is prone to false-sensing. To avoid the condition of false-sensing during operation, please refer to FIGS. 3 and 5, an insulating layer 3 is arranged underneath the membrane 1 in the instant embodiment, where a plurality of through holes 31 are aligningly arranged in correspondence to the virtual keys formed therein, the electrical conductivity of the membrane 1 and the capacitive touch panel 1 is insulated by the insulating layer 3; when the through holes 31 formed of the insulating layer 3 depress the conducting key 2, the conducting key 2 will connect directly and electrically with the capacitive touch panel A to form a corresponding circuit so as to enable the corresponding virtual keys. The insulating layer 3 arranged underneath the membrane 1, to be specific, is a high-resistance membrane with an appropriate thickness, which can also accommodate a plurality of grains or flow marks to maintain a distance between the membrane 1 and the capacitive touch panel A. The theory is based on the capacitive formula $C=\in A/d$ (C: capacitive value, $\in$:dielectric constant, A: conductive area, d: distance between the two capacitive), wherein the thickness of the insulating layer 3 and the contact area of the membrane 1 are variables influencing the inductive capacitance value. In other words, the insulating layer 3 increases the distance between the membrane 1 and the capacitive touch panel A, or decrease the contact area between the membrane 1 and the capacitive touch panel A. When the value of the inductive capacitive is below a certain standard, the object of insulating the electrical conductivity of the membrane can be achieved so as to avoid resonance from the capacitive touch panel A. The ideal thickness of the insulating layer 3 in the instant embodiment is between 0.5 mm~1.2 mm; however the thickness is not limited to by this.

The Second Embodiment

Figure 6:
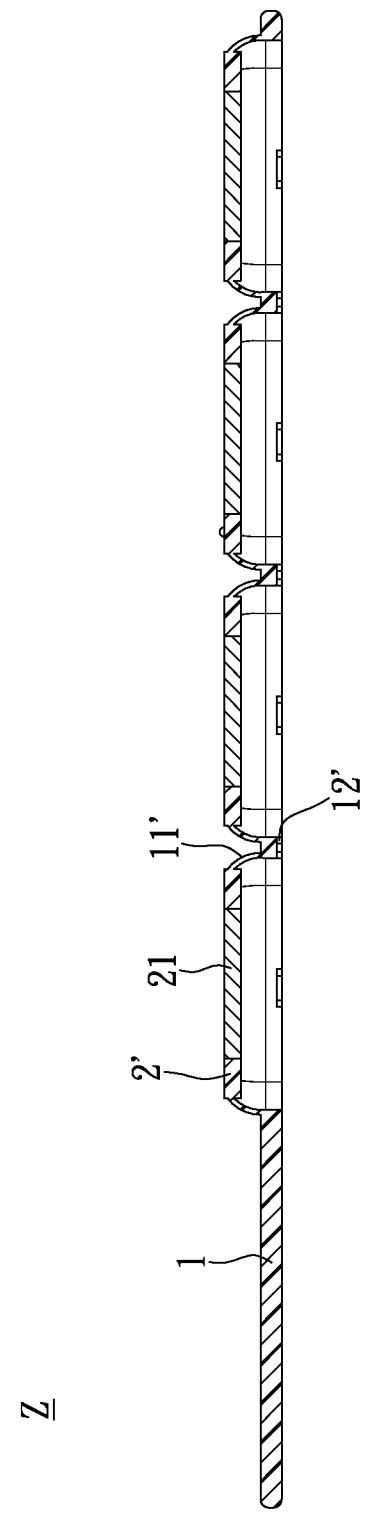
FIG. 6 shows a cross-sectional view of the second embodiment in accordance with the present invention.

With reference to FIGS. 1 and 6 wherein FIG. 6 is the cross-sectional perspective view of the second embodiment in accordance with the present invention. The cross-sectional position of the second embodiment in the present invention is identical to the FIG. 5, hence shall not introduce the position of the section line B of the instant embodiment in detail. The main difference of the instant embodiment from the first embodiment is that the instant embodiment utilize a high-resistance insulating membrane 1' to form the membrane directly, the insulting membrane 1' has a plurality of supporting members 11' arranged in correspondence to the plurality of virtual keys of the virtual keyboard; and the conducting keys 2' are arranged atop the supporting members 11'.

The ideal thickness of the supporting members 11' is between 0.2 mm~0.4 mm; when a conducting key 2' is being depressed, the arched-structure formed by the supporting members 11' enables the auxiliary input device for virtual keyboard Z to provide tactile feedback and pressure-sensitivity; however the thickness of the supporting members 11' is not limited to by this.

The auxiliary input device for virtual keyboard Z of the instant embodiment is sized on the displayed virtual keyboard of the capacitive touch panel A, each of the supporting members 11' of the insulating membrane 1', the conducting keys 2', and the capacitive touch panel A encirclingly defining an air room. As a trough 12' structure is arranged facing the virtual keyboard between every two adjacent supporting members 11', every two adjacent air rooms are mutually connected through the trough 12', to further explain, at least one air room is arranged to provide gas communication with the outside surrounding (not shown) of the input device, thereby enabling gas communication of all the air rooms between the input device and the touch screen to the outside either directly or indirectly through the troughs 12'. When the user depresses a conducting key 2', the air within the air room is being compressed and flows into the other air rooms via the trough 12'. When the conducting key 2' is released, the internal air reflows due to the air pressure difference, thus returning the conducting key 2' to the original position.

The insulating membrane 1' is arranged to insulate the electrical conductivity of the conducting keys 2'. The conducting keys 2' of the instant embodiment are separately arranged atop the different supporting members 11' of the insulating membrane 1', therefore the electrical conductivity of each of the conducting keys 2' is being insulated to ensure that when a conducting key 2' is being depressed, the conducting key 2' will connect electrically with the capacitive touch panel A to form a corresponding circuit so as to enable the corresponding virtual keys. As an insulating layer is not required by the instant embodiment, the total thickness can be thinner compared to the first embodiment. Additionally, the conducting keys 2' can further comprises a transparent portion 21 and keys which made from a combination of electrically conductive materials, thereby enabling different colors to appear in the conducting keys 2' to enhance aesthetic.

The Third Embodiment

Figure 7:
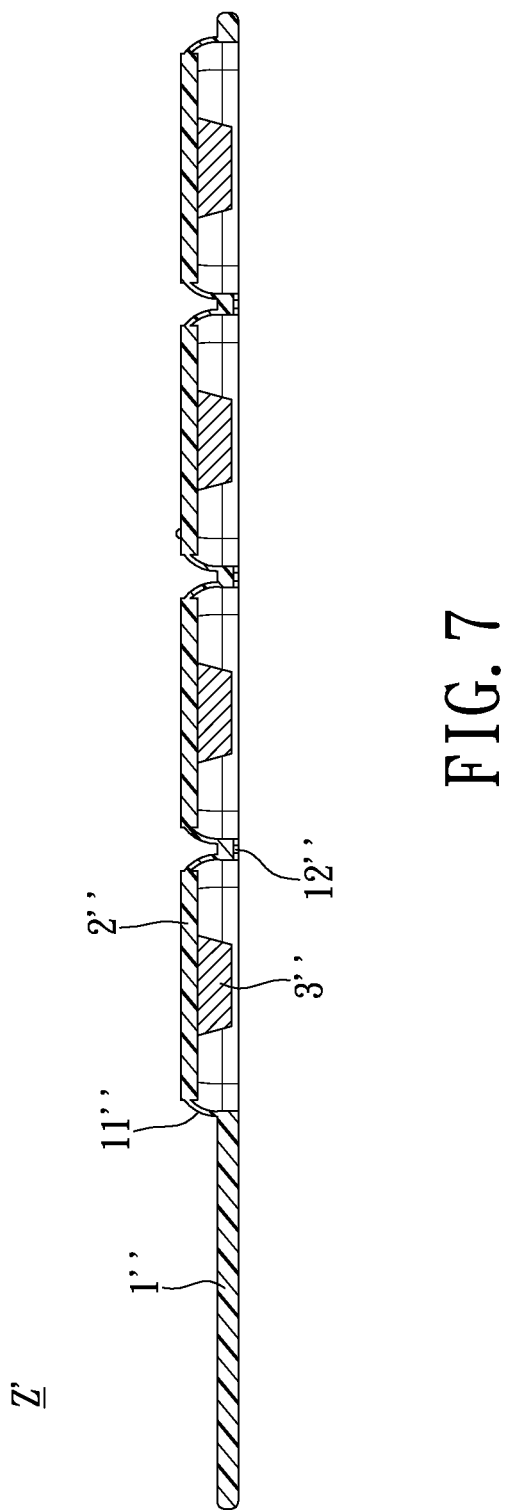
FIG. 7 shows a cross-sectional view of the third embodiment in accordance with the present invention.

With reference to FIGS. 1 and 7 wherein FIG. 7 is a cross-sectional view of the third embodiment in accordance with the present invention. The cross-sectional position of the instant embodiment is identical to the FIG. 5, hence shall not introduce the position of the section line B of the instant embodiment in detail.

The auxiliary input device for virtual keyboard Z is utilized in electrical devices having the resistive touch panel A', comprising: a membrane 1", a plurality of key portions 2" and a plurality of elastic bumps 3" wherein the membrane 1" is larger or equivalent to the virtual keyboard and has a plurality of bulged supporting members 11" arranged in correspondence to the plurality of virtual keys of the virtual keyboard, and a plurality of key portions 2" arranged atop each of the supporting members 11" and kept at a predetermined distance from the resistive touch panel A", wherein a trough 12" is arranged facing the virtual keyboard between every two adjacent supporting members 11". A plurality of elastic bumps 3" are arranged beneath the key portions 2", corresponding to the plurality of virtual keys of the virtual keyboard. The arched-structure of the supporting members 11" enables the key portion 2" of the auxiliary input device for virtual keyboard Z' to keep a distance with the capacitive touch panel A. When the key portion 2" is being depressed, a feedback response and pressure-sensitivity are provided to enable the resistive touch panel A'.

The auxiliary input device for virtual keyboard Z' of the instant embodiment is sized on the displayed virtual keyboard of the resistive touch panel A'; each of the supporting members 11" of the membrane 1", the key portion 2", and the elastic bumps 3", and the resistive touch panel A' cooperatively define an air room. As a trough 12" structure is arranged between the supporting portions 11", every two adjacent air rooms are mutually connected through the trough 12". To provide further explanation, at least one air room is arranged to provide gas communication with the outside surrounding (not shown) of the input device, thus enabling gas communication of all the air rooms between the input device and the touch screen to the outside either directly or indirectly through the troughs 12". When a user depresses a key portion 2", the air within the air room is compressed and flows into the other air rooms via the trough 12". When the key portion 2" is released, the internal air reflows due to the air pressure difference, thus returning the key portion 2" to the original position. Thus, by utilizing the trough 12" which is connected to all the air room enables air to reflow effectively into the released key portion 2" to return into the original position.

The elastic bump 3" selectively operable to establish contact with the resistive touch panel A' through the supporting member 11", when a user depresses a key portion 2", the elastic bump 3" compresses the resistive touch panel A' and results in a change of the electrical property thereof to produce a corresponding electrical signal. When the key portion 2" is released, as the pressure is being eliminated, the elastic bumps 3" returns into the original state simultaneously with the key portion 2".

The Possible Advantages of the Embodiments

The main difference between the third and the two preceding embodiments rest in the utilization of the elastic bumps arranged on the inner (display facing) surface of the key portion 2". As the touch panels belong to different technical fields, though the user has to select the type of the present invention depending on the type of the touch panel, however both types provide the following advantages:

The auxiliary input device for virtual keyboard in accordance with the present invention provides the users tactile feedback and pressure-sensitivity just like typing on a physical keyboard, without the need to solely rely on vision to pin-point the exact location of a particular key being pressed, thereby enabling the performance of the traditional "blind inputting" technique. Specifically, the auxiliary input device for virtual keyboard of the present invention is a thin-membrane structure that can be kept and installed easily, and is advantageous in its low cost construction, easy portability, and the lack of power consumption.

The descriptions illustrated supra set forth simply the preferred embodiments of the present invention; however, the characteristics of the present invention are by no means restricted thereto. All changes, alternations, or modifications conveniently considered by those skilled in the art are deemed to be encompassed within the scope of the present invention delineated by the following claims

What is claimed is:

1. An auxiliary input device for virtual keyboard sized on a displayed virtual keyboard of a capacitive touch panel, comprising:

a membrane with a plurality of bulged supporting members arranged in correspondence to the plurality of virtual keys of the virtual keyboard, wherein a trough is arranged facing the virtual keyboard between every two adjacent supporting members; and a plurality of conducting keys arranged atop each of the supporting member and kept at a predetermined distance from the capacitive touch panel, the conducting keys selectively operable to establish contact with the capacitive touch panel;

wherein an insulating layer is arranged beneath the membrane, wherein a plurality of through holes are aligningly arranged in correspondence to the virtual keys formed therein;

wherein each of the supporting members and the conducting keys, the insulating layer, and the capacitive touch panel encirclingly defining an air room;

wherein every two adjacent air rooms are connected through the trough, wherein at least one air room is arranged to provide gas communication with the outside surrounding of the input device, thereby enabling gas communication of all the air rooms between the input device and the touch screen to the outside either directly or indirectly.

2. The auxiliary input device for virtual keyboard according to claim 1, wherein each of the conducting key includes a transparent portion.

3. An auxiliary input device for virtual keyboard sized on a displayed virtual keyboard of a resistive touch panel, comprising:
- a membrane which has a plurality of bulged supporting members arranged in correspondence to the plurality of virtual keys of the virtual keyboard, and a plurality of key portions arranged atop each of the supporting members and kept at a predetermined distance from the resistive touch panel, wherein a trough is arranged facing the virtual keyboard between every two adjacent supporting members; and
- a plurality of elastic bumps arranged beneath the key portions selectively operable to establish contact with the resistive touch panel;
- wherein each of the supporting members, the key portion, and the elastic bumps, and the resistive touch panel encirclingly defining an air room;
- wherein every two adjacent air rooms are connected through the troughs, wherein at least one air room is arranged to provide gas communication with the outside surrounding of the input device, thereby enabling gas communication of all the air rooms between the input device and the touch screen to the outside either directly or indirectly.

4. An auxiliary input device for virtual keyboard sized on a displayed virtual keyboard of a capacitive touch panel, comprising:
- a membrane with a plurality of bulged supporting members arranged in correspondence to the plurality of virtual keys of the virtual keyboard, wherein a trough is arranged facing the virtual keyboard between every two adjacent supporting members; and
- a plurality of conducting keys arranged atop each of the supporting member and kept at a predetermined distance from the capacitive touch panel, the conducting keys selectively operable to establish contact with the capacitive touch panel;
- wherein the membrane is an insulating membrane;
- wherein each of the supporting members, the conducting key, and the capacitive touch panel cooperatively define an air room;
- wherein every two adjacent air rooms are connected through the trough, wherein at least one air room is arranged to provide gas communication with the outside surrounding of the input device, thereby enabling gas communication of all the air rooms between the input device and the touch screen to the outside either directly or indirectly.

* * * * *